United States Patent [19]

Hähn

[11] 4,154,609

[45] May 15, 1979

[54] METHOD OF PRODUCING POROUS METAL BODIES FOR USE IN THE ELECTRONIC INDUSTRY

[75] Inventor: Reinhard Hähn, Langelsheim, Fed. Rep. of Germany

[73] Assignee: Hermann C. Starck Berlin, Berlin, Fed. Rep. of Germany

[21] Appl. No.: 769,603

[22] Filed: Feb. 17, 1977

[30] Foreign Application Priority Data

Mar. 11, 1976 [DE] Fed. Rep. of Germany ....... 2610224

[51] Int. Cl.² .............................................. B22F 3/00
[52] U.S. Cl. .................................... 75/252; 29/570; 75/222; 75/208 R; 75/211; 75/255; 252/512; 252/518; 428/566
[58] Field of Search ........................... 29/570; 313/311; 75/208 R, 211, 222, 252, 255; 252/512, 518; 428/566

[56] References Cited

U.S. PATENT DOCUMENTS

| | | | |
|---|---|---|---|
| 3,303,370 | 2/1967 | Boes et al. ............................. | 310/252 |
| 3,627,520 | 12/1971 | Rogers ..................................... | 75/222 |
| 3,818,581 | 6/1974 | Vartarian et al. ....................... | 29/570 |
| 3,843,492 | 10/1974 | Bernard .................................... | 29/570 |
| 3,846,260 | 11/1974 | Bernard .................................... | 29/570 |
| 3,889,357 | 6/1975 | Millard et al. .......................... | 29/570 |
| 4,041,359 | 8/1977 | Mizushima et al. .................... | 29/570 |

OTHER PUBLICATIONS

Jones, Fundamental Principles of Powder Metallurgy (1960) pp. 306–307.

*Primary Examiner*—Brooks H. Hunt
*Attorney, Agent, or Firm*—Ladas, Parry, Von Gehr, Goldsmith & Deschamps

[57] ABSTRACT

The production of highly porous sintered bodies useful for the manufacture of electrolytic capacitors by using as a lubricant for the base metal powder, usually tantalum, about 0.01 to about 10% by weight of an inorganic lubricant, particularly a sulfide, selenide or telluride of a metal of subgroup V or VI of the Periodic Table or nitrides of boron or silicon.

12 Claims, No Drawings

METHOD OF PRODUCING POROUS METAL BODIES FOR USE IN THE ELECTRONIC INDUSTRY

The present invention relates to the production of highly porous sintered bodies (compacts). More particularly, the invention relates to the production of metallic anodes for the manufacture of electrolytic capacitors by the addition of lubricants for facilitating the molding (pressing) operation and, at the same time, improving the electrical qualities of the finished capacitors.

Metal anodes for electrolytic capacitors are customarily produced by pressing the metal powder while adding an organic molding aid, such as, for example, camphor or wax, in order to conserve the molding tools and, furthermore, in order to obtain molded articles having the desired low green density. The latter is absolutely required in order to insure the desired porosity in the sintered metal body. The greater the porosity, the larger will be the inner surface of the molded article and, thereby, also the surface of the oxide layer produced by the forming, which, as a dielectric, also helps to determine the capacitance of the capacitor. By "charge" is meant the product of the capacitance and the forming voltage, according to formula $L = Vf \cdot C$ and $Vf$ = forming voltage in V $C$ = capacitance in $\mu F$ $L$ = charge.

The surface may be influenced by many factors such as, for example, by the use of a highly porous powder or by low sintering temperatures or by low molding density or even by means of a shortened sintering period. However, in practice it is not possible to change all indicated influencing factors beyond certain limits since adequate mechanical strengths are also expected from the finished metal bodies. Furthermore, during the sintering of the metal bodies, a post-purification takes place which depends on the sintering temperature. Therefore, neither the sintering period nor the sintering temperature can be lowered too much. If, a maximum charge per gram ($\mu FV/g$) of a sinter body is still desired, the pressing density must be decreased. Customarily this is done in accordance with known and conventional methods, by the addition of an organic binder which accomplishes the lubrication of the tool as well as the binding of the powder particles with each other. At the same time, this provides also a statistically uniform distribution of the pressed metal powders in the pressed articles. The known binders are camphor (natural or synthetic), carbon wax, nibrin wax, stearic acid, acetylcellulose, either along or in combination. Usually 2 to 10 percent by weight is added in order to obtain the desired properties for the molding step.

However, these known and practiced methods have the disadvantage of having to remove the organic binder prior to the sintering process. This is done through heat processing between 200° and 900° C. The "dewaxing process" must be carried out in a vacuum due to the tendency to oxidize of the pertinent metal powders, which results in additional expense.

If metal powders are pressed without binder addition, the molding tools wear out unusually fast. Moreover, the molded article has non-homogenous densities. These disadvantages cannot be adequately overcome even through the known use of halogenated organic solvents, liquid or gaseous, such as, for example, trichloroethylene, Freon (dichlorodifluoromethane), and the like, because the variation in density in the pressed article remains unsatisfactory.

Observations over many years have shown that during the molding of metal powder into anodes, without adding lubricants, approximately 50,000 pressings can be expected before the tool will wear out. If, at the same anode size, one uses, for example, trichloroethylene as a lubricant, the expected life of the tools may be up to 100,000 pressing operations. With an addition of 2% by weight camphor and with the use of the same metal powder, and of the same tool steel for producing the same anode magnitude, a life expectancy of approximately 300,000 pressing processes may be possible. This shows how important lubrication is for the molding step.

It must therefore be concluded from the prior art that the addition of a lubricant is necessary for an economical production of molded anodes. The applied lubricants must be totally removed prior to the sintering process in order to prevent the negative influence on the sinter body. As previously described, the removal of the lubricant entails much cost.

In accordance with the present invention it was surprisingly discovered that when known inorganic lubricants are employed as a molding aid, they have a very beneficial influence upon the pressing cycle, in a manner whereby the tool life is considerably prolonged and the distribution of the metal powder in the pressed articles becomes homogeneous. Preferably, 0.01 to 10% by weight, preferably 0.02 to 5% by weight, of an inorganic lubricant is used based on the total weight of the molding mixture.

The green compact articles can be subjected to sintering without the removal of the inorganic lubricant. The densities of the sintered bodies obtained are particularly often below the green densities of the pressed bodies. Despite the fact a portion of the lubricants remains in the anodes, following the sintering process, a considerable improvement of the electrical properties is attained since said inorganic lubricant affects the electrical properties of the resulting sintered body.

Particularly suitable lubricants, according to the invention, are the sulfides, selenides and tellurides of subgroups IV, V and VI of the Periodic Table and the nitrides of boron and silicon. Furthermore, it was found that a portion of the lubricants can be provided by through inorganic oxides, admixed with the lubricant, prior to the mixing of the lubricant with the valve metal powder, without diminishing the positive qualities of the lubricant. The basic metal may be tantalum and its alloys as well as other metals of group IVB, VB and VIB of the periodic system and their alloys.

The following Examples will illustrate the advantage provided by the present invention without limiting its scope. The tests were conducted with sintering temperatures of 1,550° to 1,850° C., sintering periods lasting from 10 to 40 minutes and the pressing densities of the green compacts were 4 to 8 g./cm$^3$.

In order to better judge the effect of the individual lubricant additives, the tantalum metal powder capacitor quality used, the green density of the pressed anodes, the sintering time and the sinter temperatures are kept constant in the following Examples. This makes it possible directly to deduce the effect of the additives with respect to the valves of the charge, the residual current, the series resistance, the break-down voltage and the density of the sintered anodes.

EXAMPLE 1

Conventional tantalum metal capacitor quality (Tantalum metal powder grade 290 produced by Hermann C. Starck Berlin, according to specifications) was thoroughly mixed with 0.25% Mo-sulfide (Molyform 15, extra fine, made by Hermann C. Starck Berlin, average particle size 0.6 to 0.8 my). This mixture was compressed on a Dorst TPA-4 S Exenter press, into anodes with a diameter of 6.5 mm. The weight of an anode was 2 gram and the green density was about 7 g/cm$^3$. Subsequently, the anodes were sintered for 30 minutes at 1,600° C. The sintered, finished anodes had a density of 6.8 g/cm$^3$. The analysis showed a residual amount of 0.16% Mos$_2$ in the sintered anodes, which corresponds to 64% of the solid lubricant Mo-sulfide used. The electrical test of the anodes obtained according to the invention produced a leakage current of 2.5 μA/g at a charge of 8,540 μFV/g, a break-down voltage of 134 V and an equivalent series resistance of 6.4 Ohm.

If the same tantalum metal grade 290 is compressed without an additive, with the same green density and, under the same conditions, the following electrical values are obtained:

leakage current 2.4 μA/g charge 6420 μFV/g

The equivalent series resistance is 7 Ohm and the breakdown voltage is 131 V.

It is noteworthy that the sinter density of the anodes, according to the invention, is 3% below the green density and 8% below the sinter density of the comparison anodes. The charge per gram rose by 33%. Using the anodes of the invention of Example 1, there were produced using conventional methods dry capacitors with a solid semiconductor coating, of the type 150 μF/30 V. On reversing poles, these capacitors showed no change in the leakage current, while capacitors of the comparison anodes were chargeable only up to 2.5 V. in the opposite direction.

EXAMPLE 2

Tantalum metal powder capacitor quality 290 R (as in Example 1) was intensively mixed with 0.8% Ta-sulfide and compressed on anodes of green density 7 g/cm$^3$ with the same arrangement as in Example 1. After 30 minutes of sintering at 1600° C., sinter anodes of a 6.9 g/cm$^3$ density were obtained, with a residual content of 0.064% TaS$_2$ corresponding to 8% of the Ta-sulfide employed. The electrical test showed that the leakage current had dropped to 1 μA/g, which represents an outstanding value. The capacity was still at 6700 μFV/g at an equivalent series resistance of 5.8 Ohm. The breakdown voltage rose to 150 V.

EXAMPLE 3

Tantalum metal powder 290 was thoroughly mixed with 0.2% boron nitride, as in Example 1, pressed to a green density of 7 g/cm$^3$ and sintered for 30 minutes, at 1600° C. Analysis showed that 55% of the employed boron-nitride was still in the sintered anodes. The sinter density of the anodes was determined as 6.7 g/cm$^3$. The electrical test showed a leakage current of 1.9 μA/g, at a charge of 7500 μFV/g, a series resistance of 6.8 Ohm and a breakdown voltage of 128 V.

The tests were also conducted with a number of other solid lubricants, with and without an oxide addition. The essential results of these tests are compiled in Tables 1 to 4. They all show the positive influence of the solid lubricants, in accordance with the invention, upon the electrical qualities of the finished, sintered anodes. In addition it should be noted that by using the mixture of Example 1, no substantial attach on the pressing tool could be observed after 200,000 pressings, while when no lubricant was added, the pressing tools had to be replaced after 150,000 pressings.

TABLE 1

| | Sulfide | | | | without addition |
|---|---|---|---|---|---|
| Lubricant | MoS$_2$ | WS$_2$ | MoS$_2$ | TaS$_2$ | |
| Tantalum Metal Powder | 290 | 290 | 290 | 290 | 290 |
| Lubricant additive | 0.25% | 0.20% | 3% | 0.8% | without addition |
| % Lubricant in the sintered metal | 0.16% | 0.06% | 0.1% | 0.06% | — |
| Green density g/cm$^3$ | 7.0 | 7.0 | 7.0 | 7.0 | 7.0 |
| Sinter density g/cm$^3$ | 6.8 | 6.8 | 6.9 | 6.9 | 7.4 |
| Sinter Temperature °C. | 1600 | 1600 | 1600 | 1600 | 1600 |
| Sinter time in minutes | 30 | 30 | 30 | 30 | 30 |
| Charge in μFV/g | 8540 | 8500 | 6800 | 6700 | 6420 |
| Leakage current in μA/g | 2.5 | 2.9 | 4.0 | 1.0 | 2.4 |
| Equivalent series resistance Ω | 6.4 | 6.3 | 6.8 | 5.8 | 7.0 |
| % Lubricant of the the employed amount in the sintered body | 64 | 30 | 3.3 | 7.5 | — |

TABLE 2

| | Selenide | | without addition |
|---|---|---|---|
| Lubricant | WSe$_2$ | TaSe$_2$ | |
| Tantalum Metal Powder | 290 | 290 | 290 |
| % Lubricant additive | 0.28% | 0.28% | without addition |
| % Lubricant in the sintered metal | 0.043% | 0.045% | — |
| Green density g/cm$^3$ | 7.0 | 7.0 | 7.0 |
| Sinter density g/cm$^3$ | 7.1 | 7.4 | 7.4 |
| Sinter Temperature °C. | 1600 | 1600 | 1600 |
| Sinter time in minutes | 30 | 30 | 30 |
| Charge in μFV/g | 7300 | 6800 | 6420 |
| Leakage current in μA/g | 2.6 | 1.8 | 2.4 |
| Equivalent series resistance Ω | 6.9 | 6.9 | 7.0 |
| % Lubricant of the employed amount in the sintered body | 15.4 | 16.1 | |

TABLE 3

| | Nitride | | | without addition |
|---|---|---|---|---|
| Lubricant | BN | BN | Si$_3$N$_4$ | |
| Tantalum Metal Powder | 290 | 290 | 290 | 290 |
| % Lubricant additive | 0.2% | 8% | 0.13% | without addition |

TABLE 3-continued

|  | Nitride | | | without addition |
|---|---|---|---|---|
| % Lubricant in the sintered metal | 0.11% | 2.16% | 0.06% | |
| Green density g/cm$^3$ | 7.0 | 7.0 | 7.0 | 7.0 |
| Sinter density g/cm$^3$ | 6.7 | 5.3 | 7.2 | 7.4 |
| Sinter Temperature °C. | 1600 | 1600 | 1600 | 1600 |
| Sinter time in minutes | 30 | 30 | 30 | 30 |
| Charge in μFV/g | 7500 | 6580 | 7200 | 6420 |
| Leakage current in μA/g | 1.9 | 1.7 | 1.0 | 2.4 |
| Equivalent series resistance Ω | 6.8 | 6.0 | 7.1 | 7.0 |
| % Lubricant of the employed amount in the sintered body | 55 | 27 | 46 | — |

TABLE 4

|  | Mixtures | | | without addition |
|---|---|---|---|---|
| Lubricant | MoS$_2$ + HfO$_2$ | BN + NbSe$_2$ | BN + Si$_3$N$_4$ + MoO$_3$ | |
| Tantalum Metal Powder | 290 | 290 | 290 | 290 |
| % Lubricant additive | 0.2% + 0.1% | 0.1% + 0.3% | 100 ppm + 100 ppm + 300 ppm | — |
| % Lubricant in the sintered metal | 0.16 + 0.04 | 0.04 + 0.028 | 70 ppm + 54 ppm + 120 ppm | — |
| Green density g/cm$^3$ | 7.0 | 7.0 | 7.0 | 7.0 |
| Sinter density g/cm$^3$ | 6.8 | 6.8 | 6.6 | 7.4 |
| Sinter Temperature °C. | 1600 | 1600 | 1600 | 1600 |
| Sinter time in minutes | 30 | 30 | 30 | 30 |
| Charge in μFV/g | 7180 | 7030 | 7600 | 6420 |
| Leakage current in μA/g | 2.0 | 2.5 | 2.3 | 2.4 |
| Equivalent series resistance Ω | 6.5 | 6.6 | 6.4 | 7.0 |
| % Lubricant of the employed amount in the sintered body | 67 | 17 | 49 | — |

What I claim is:

1. In a method of producing a porous sintered metal body which comprises molding under pressure metal power to form a molded body and sintering said molded body, said metal being selected from the group consisting of groups IVB, VB, and VIB of the Periodic Table, which comprises prior to the molding step admixing with the metal powder about 0.01 to about 10% by weight of at least one inorganic lubricant selected from sulfides, selenides and tellurides of a member of subgroups V and VI of the Periodic Table, whereby the sintered metal body still contains 2% to 70% by weight of the inorganic lubricant.

2. The method according to claim 1, wherein a mixture of different inorganic lubricants is used.

3. A method according to claim 1, wherein there is also admixed with the metal powder an oxide selected from the group consisting of a member of subgroupd IV, V and VI of the Periodic Table.

4. The method according to claim 1, wherein the metal powder comprises tantalum or a tantalum alloy.

5. The method according to claim 1, wherein the metal powder is mixed with 0.02 to 5% by weight of the inorganic lubricant.

6. The method according to claim 1, wherein there is included in the admixture an oxide selected from the group consisting of a member of subgroups IV, V and VI of the Periodic Table.

7. A sintered molded body produced by the method of claim 1.

8. A sintered molded body according to claim 7 molded into the shape of an anode for an electrolytic capacitor.

9. A mixture for forming molded sintered bodies which comprises a powdered base metal selected from the group consisting of groups IVB, VB and VIB of the Periodic Table and at least one inorganic lubricant selected from sulfides, selenides and tellurides of a member of subgroups V and VI of the Periodic Table, said lubricant being present in an amount of about 0.01 to about 10% by weight.

10. A green compact produced by molding under pressure a mixture according to claim 9.

11. A mixture according to claim 9, in which the base metal is tantalum.

12. A mixture according to claim 9, which includes an oxide selected from the group consisting of a member of groups of subgroups IV, V and VI of the Periodic Table.

* * * * *